United States Patent
Friest et al.

(10) Patent No.: US 6,953,205 B2
(45) Date of Patent: Oct. 11, 2005

(54) MULTILAYER MOLDED ELEMENT

(75) Inventors: Christoph Friest, Bielefeld (DE); Georg Eichhorn, Herford (DE); Meinolf Seifert, Altenbeken (DE); Ralf Dopheide, Bielefeld (DE)

(73) Assignee: CWW-Gerko Akustik GmbH, Bielefeld (DE)

(*) Notice: Subject to any disclaimer, the term of this patent is extended or adjusted under 35 U.S.C. 154(b) by 0 days.

(21) Appl. No.: 10/182,596

(22) PCT Filed: May 12, 2001

(86) PCT No.: PCT/EP01/05444

§ 371 (c)(1),
(2), (4) Date: Jul. 29, 2002

(87) PCT Pub. No.: WO01/89883

PCT Pub. Date: Nov. 29, 2001

(65) Prior Publication Data

US 2003/0011183 A1 Jan. 16, 2003

(30) Foreign Application Priority Data

May 21, 2000 (DE) .......................... 100 24 496

(51) Int. Cl.⁷ .............................................. B60R 19/00
(52) U.S. Cl. ..................... 280/770; 280/847; 280/154
(58) Field of Search ........................ 280/847, 848, 280/154, 849, 850, 853, 762, 770; 296/298, 39.1, 39.3; 293/112; 428/68, 74, 71, 76, 99, 37, 304.4, 411.1, 811, 219

(56) References Cited

U.S. PATENT DOCUMENTS

| | | | | |
|---|---|---|---|---|
| 1,704,048 A | * | 3/1929 | Jordan ..................... 280/847 |
| 4,101,704 A | * | 7/1978 | Hiles ....................... 428/218 |
| 4,555,380 A | * | 11/1985 | Munakata et al. ......... 264/510 |
| 4,735,427 A | | 4/1988 | Fuchs ....................... 280/152 |
| 5,094,318 A | * | 3/1992 | Maeda et al. ............. 181/290 |
| 5,251,414 A | * | 10/1993 | Duke ...................... 52/309.16 |
| 5,280,960 A | * | 1/1994 | Casey ....................... 280/848 |
| 5,378,733 A | * | 1/1995 | Bates et al. ................. 521/54 |
| 5,462,331 A | | 10/1995 | Stief et al. ................ 296/198 |
| 5,681,072 A | * | 10/1997 | Stricker .................... 296/39.3 |
| 5,767,024 A | * | 6/1998 | Anderson et al. .......... 442/378 |
| 5,839,761 A | * | 11/1998 | Dodt ........................ 280/851 |
| 5,915,767 A | * | 6/1999 | Hosoda et al. ............. 293/126 |
| 5,976,646 A | * | 11/1999 | Stevens et al. .............. 428/31 |
| 6,086,104 A | * | 7/2000 | Marchisio et al. .......... 280/851 |
| 6,152,259 A | * | 11/2000 | Freist et al. ............... 181/290 |
| 6,155,624 A | * | 12/2000 | Bienenstein, Jr. .......... 296/37.1 |
| 6,713,150 B2 | * | 3/2004 | Alts et al. ................... 428/73 |

FOREIGN PATENT DOCUMENTS

| | | |
|---|---|---|
| DE | 1555288 | 10/1970 |
| DE | 3313044 | 10/1984 |
| DE | 29615757 | 1/1998 |
| DE | 19909615 | 9/2000 |
| EP | 0222193 | 5/1987 |
| EP | 0810145 | 12/1997 |
| EP | 0887483 | 12/1998 |
| EP | 1034920 | 9/2000 |

\* cited by examiner

*Primary Examiner*—Christopher P. Ellis
*Assistant Examiner*—Brian Swenson
(74) *Attorney, Agent, or Firm*—Fay, Sharpe, Fagan, Minnich & McKee, LLP

(57) ABSTRACT

A multilayer molded element (1) is molded to an appropriate shape which conforms to an underside of floor areas or wheel housings of a vehicle. The multilayer structure includes a non-woven, resilient layer (3) which functions as a shock absorber and spring to absorb impact and damp noise. The resilient layer is disposed between cover layers (4, 5). Optionally, fabric layers (6, 7) are bonded to outsides of the cover layers.

19 Claims, 5 Drawing Sheets

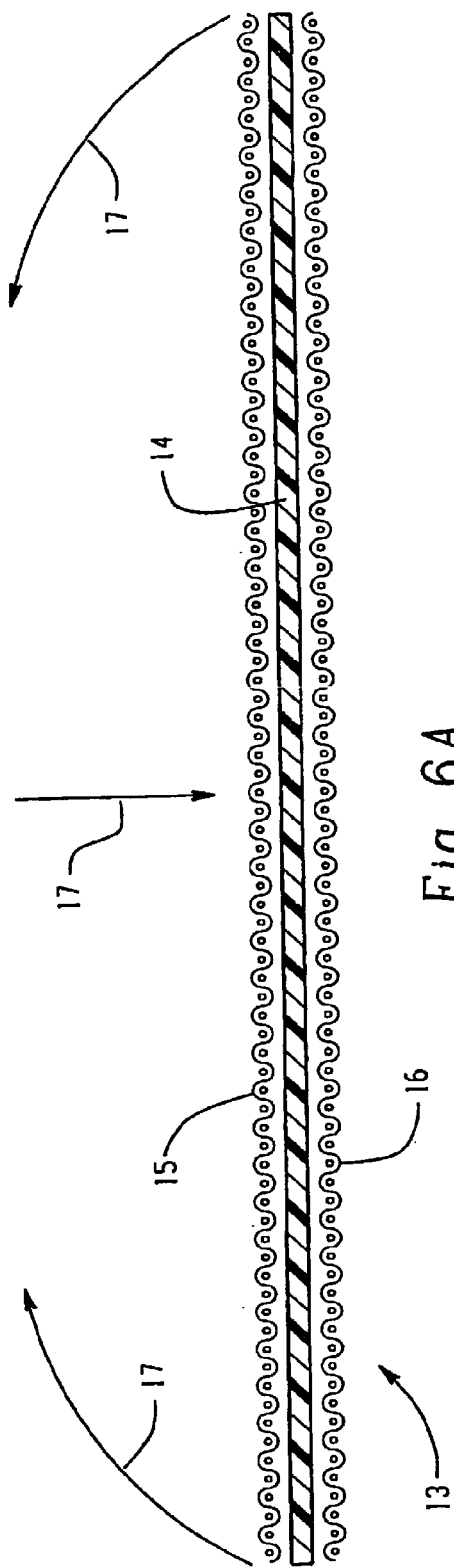
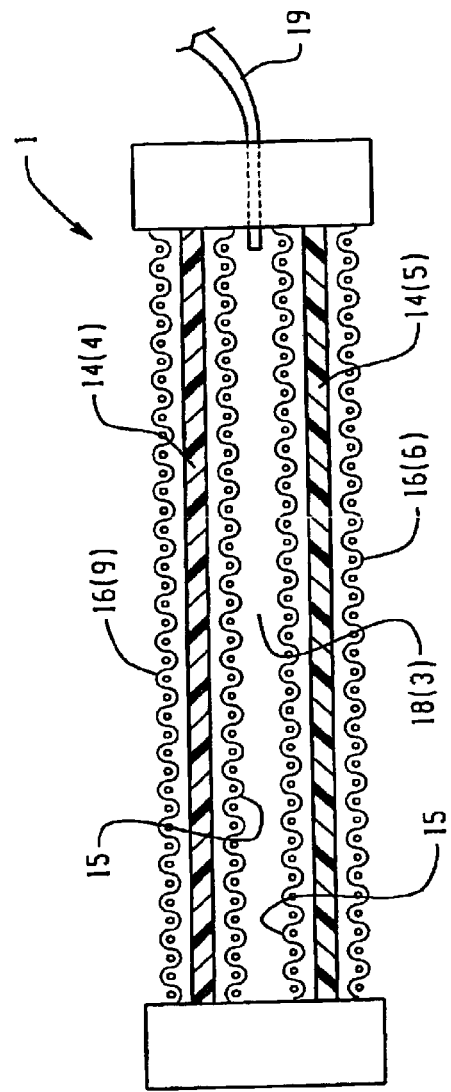

MULTILAYER MOLDED ELEMENT

BACKGROUND OF THE INVENTION

The invention relates to a multilayer molded element suitable for bottom covering of vehicle floor areas or wheel housings. Molded elements of this type are utilized in order to protect the automobile body from whirled-up stones as well as spray water and in order to diminish the noise level in the interior of the vehicle and on the outside the vehicle.

When driving on gravel-paved streets and on wet roadways, stones and/or droplets of water are carried along by the tires and propelled at high speed against the vehicle body. On the one hand, this causes damage to the vehicle finish on the underside, so that corrosion may set in. In addition, the transfer of energy from the stones to the vehicle body leads to a broad-band, impulse-like vibration excitation (sound conducted through solids) of the vehicle body, which is radiated into the interior of the vehicle or outside of same in form of rattling—or crackling noise.

Hitherto customary facings of the wheel housing and the underfloor were typically made of plastic and essentially serve only for protecting the vehicle body from impacting stones. Due to the hard-surfaced solid construction, the vibration energy is not converted into heat upon the impact of the stones or water droplets, but is radiated as airborne sound either directly from the structural member or, after transfer of solid-borne sound, from the vehicle body. Other noises in the underfloor region, for example rolling motion noises or fume emission noises resulting from the exhaust train are reflected in undiminished fashion by the hard-surfaced facings.

A molded element of the here concerned type, serving as wheel house facing is known from U.S. Pat. No. 4,735,427. The layered construction comprises a dual layer, made of a layer of fibrous material and a plastic fiber layer. The two layers are needled together. Following joining by needles, the dual layer is molded by thermal deformation into a stable shell, adapted to the contour of the wheel housing. The plastic fiber/fibrous material dual layer shell, joined by means of needles, is, overall, relatively stable or hard after its deformation, so that it cannot optimally satisfy customer demands for more efficient noise reduction.

SUMMARY OF THE INVENTION

The present invention is based on the object of designing a molded element of the initially mentioned type in such manner that there is improved air-borne noise absorption and minimized excitation of solid-borne sound. In addition, the invention-specific type elements must be producible in simpler fashion.

According to the invention, these objects are solved by the distinguishing characteristics of the patent claims.

The basic benefit of the multi-layer construction according to the invention includes that the kinetic energy of impinging projectiles (stones, water droplets etc.) is distributed and attenuated over a large elastic volume. The entire element achieves efficient noise reduction, while low in weight, and this applies both with respect to excitation from projectiles as well as with respect to rolling motion noise. Whereas with relatively hard shells, the exterior noise is reflected and again radiated, with the molded element according to the invention it is possible substantially deposit the sound energy in the elastic-mass-system, which is formed by the relatively thick elastic and the wheel-side cover layer or cover lays, so that it is dissipated therein. In addition, absorption of high-frequency sound takes place in the top layer of fibrous material and of low-frequency sound in the total system.

In contrast to the state of the art, the manufacture of a molded element according to the invention is also simplified. It is no longer necessary to produce a needle-joined dual layer in a separate production step prior to the deformation of the element. Aside from joining and deformation of the layer construction, it is possible in one single working step to also undertake local compression, for example in the area of the edges. This results in complete sealing of the inner elastic layer, so that hollow spaces accessible to water and mud can no longer develop. Delaminating of the layered construction is reliably prevented.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 6A illustrates a preferred construction method;

FIG. 6B illustrates another alternate embodiment of the multi-layer molded element manufactured in accordance with the method illustrated in FIG. 6A;

DETAILED DESCRIPTION OF THE PREFERRED EMBODIMENTS

FIGS. 1 to 4 present variations of the layered construction of a molded or structural element 1 according to the invention. For identification of position, a wheel 2 is respectively indicated.

In FIGS. 1 to 4, the relatively thick elastic layer, enclosed by cover layers 4, 5 (and/or 8 ) is designated with 3. Layer 4, respectively located on the side facing the vehicle, is a sufficiently heavy (approximately 500 µm) thermoplastic or duroplastic cover layer (made for example of polypropylene film or resin-coated PES fabric) which contributes not only the sealing function but also mechanical stability to the structural element 1 and which serves as a base for the assembly.

Figure 1:
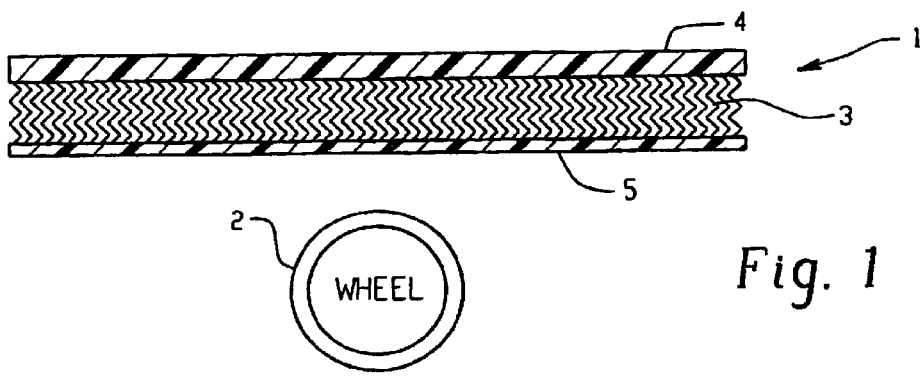
FIG. 1 is a side sectional view of a preferred embodiment of a layered molded construction for covering motor vehicle floor areas or wheel housings.

In the embodiment according to FIG. 1, Layer 5 is provided on the wheel side. This involves, for example, a film made of thermo- or duro-plastic material, whose essential function it is to absorb and distribute the impact energy. This film is so thin (e.g. 1000 µm) that solid-borne sound excitation does not take place by macroscopic deformation. Local deflections in the film are spring cushioned and attenuated by the inner elastic layer 3. In addition the film forms protection for the inner layer 3 and increases dimensional stability as well as stability of total construction.

Figure 2:
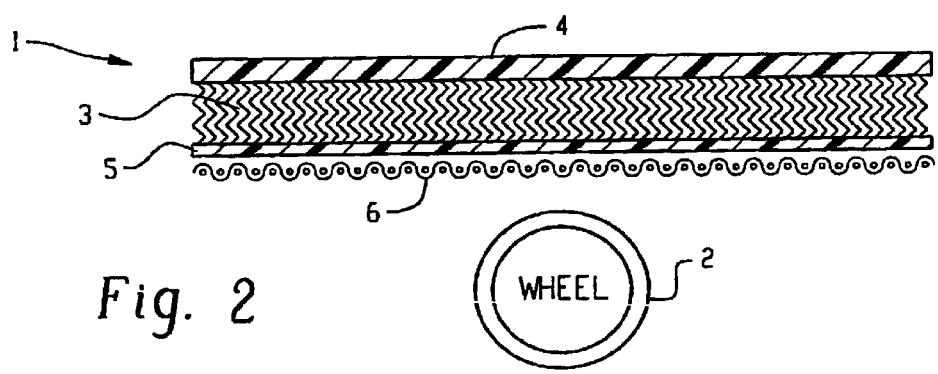
FIG. 2 is a side sectional view of an alternate embodiment of the multi-layered molded element of FIG. 1.

In the embodiment according to FIG. 2, layer 5 is covered on the side facing the wheel—that is, it is covered with a relatively thin polyester fabric 6 with a weight per unit area on the order of 100 g/m². Said layer 6 already exercises a braking effect on stones, water droplets, etc., so that layer 5 needs to only absorb the remaining impact energy and distribute same over the elastic layer. Of essential significance are, in addition, the absorption of high-frequency sound, the protective effect of the layer located behind and the improved handling of the structural element.

The inner layer 3 with a weight per unit area on the order of 300 g/m² functions as spring for the vibration brought in from the previous layer. It may be needled for improvement of elastic properties.

Figure 3:
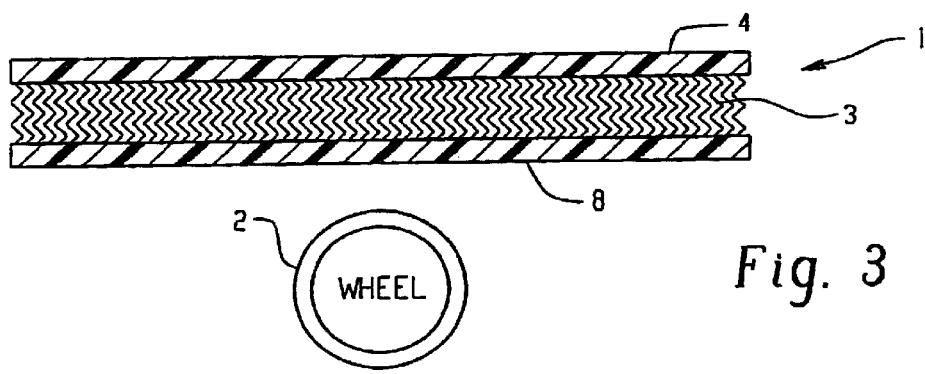
FIG. 3 is another alternate embodiment of the multi-layered molded element of FIG. 1.

In the embodiment according to FIG. 3, layer 8, designed as a type of cover layer 4, has the function of layers 5, 6 according to FIG. 2.

Figure 4:
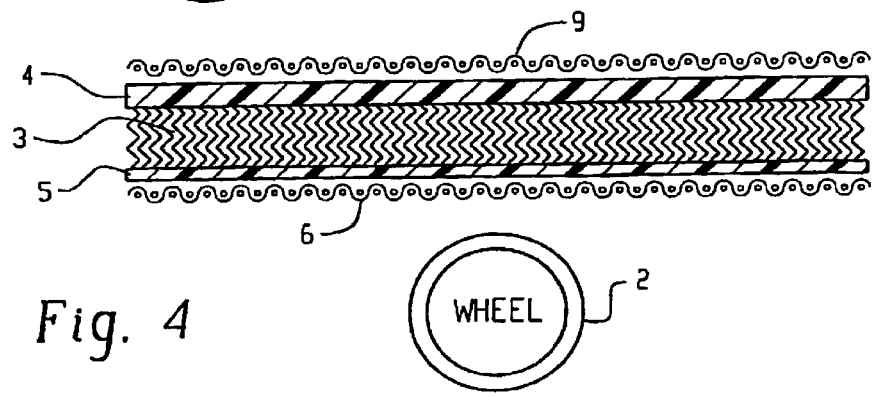
FIG. 4 is another alternate embodiment of the multi-layered molded element of FIG. 1.

In the exemplary embodiment according to FIG. 4, a cover layer 9 is also provided on the side of the structural element 1, facing away from wheel 2. It is appropriately made of the same material as layer 6, facing the wheel. It improves the high-frequency absorption and has proven itself appropriate for the handling of the softened layer 4.

In all types of embodiments according to FIGS. 1 to 4, the layer 5 or 8, respectively facing the wheel, is designed in such manner so as to prevent acceptance of water- and/or mud.

Absorption of air-borne sound essentially takes place via the inner layer 3, which is protected from taking in water because of the cover layers.

Figure 5:
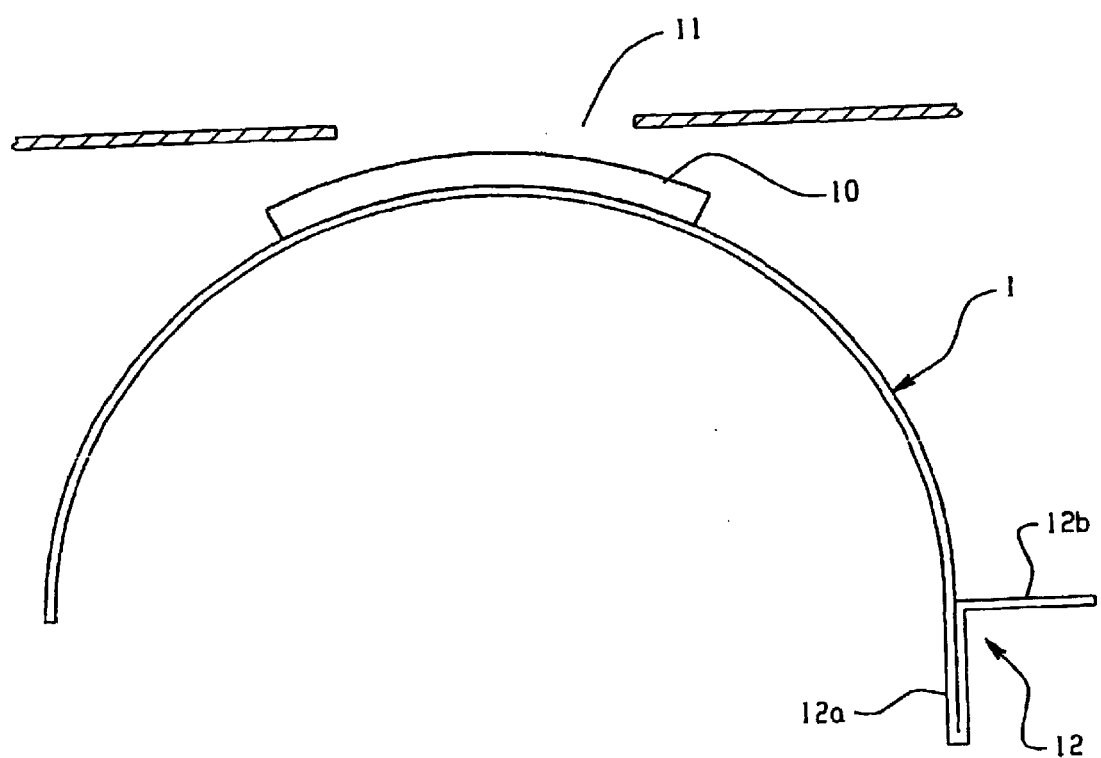
FIG. 5 is a side sectional view of the multi-layered constructions of any one of FIGS. 1–4 molded to conform with a vehicle section.

FIG. 5 schematically depicts a molded element 1 according to the invention designed for a wheel housing, onto the outside of which is attached a function-expanding element 10. Such locally attached and locally effective layer segments 10 are appropriate, for example, in the area of perforations towards the engine (schematically indicated in FIG. 5 and identified with 11), or in the vicinity of the exhaust gas line. For example, a heavy foil segment can increase attenuation locally, a foil absorber is able to improve absorption and an aluminum foil can improve heat protection. Suitable additional foil segments can, finally, also still further increase the ability to resist wear and tear and/or simplify cleaning.

FIG. 5 also indicates that the structural element 1 is equipped with a T-structure 12. It comprises the wheel-side extension 12a and, vertically supported thereon, section 12b. The purpose of the T-component 12 will be described later on.

As material for the cover layers 4, 5 and/or the textured fabrics 6, 9 the following materials may be employed: polyester (PES), polypropylene, polyethylene or carbon fiber. Acoustically particularly effective is a cover fabric with a weight per area unit of approximately 50 to approximately 200 g/m², preferably approximately 120 g/m².

With respect to the acoustical effect of the spring-mass-system, the properties of layers 3 and 5 (material, thickness) are particularly relevant. The following materials may be used for layer 5: polypropylene, polyethylene, polyester, polyurethane, EPDM, caoutchouc, thermo-plastic materials having similar properties—all of them new or re-cycled—or also mixtures of the named materials. They have suitable chemical properties and a relatively low weight. The thickness of layer 5 ranges appropriately between 100 to 500 µm, preferably between 150 to 250 µm.

As already mentioned, the cover layer 4, which is facing away from the wheel 2, is made of the same material as cover layer 5. Its thickness is greater than the thickness of cover layer 5, namely 200 to 1000 µm, preferably 300 to 600 µm.

Layer 3, which, appropriately, is to have excellent elastic and absorption properties, can be made of textured fabric or also of foam. As textured fabric materials may be employed the following: polyester, polypropylene, other thermoplastic materials having similar properties, cotton, cellulose, mineral wool or mixtures of these materials. The textured fabric may be designed as layers of textured fabric or as blow-type textured material. The joining technology also has an influence upon the desired effect. Appropriate is the use of a needled fabric, a thermo-bonding fabric or a mixture of the two.

Hardness and spring force of layer 3 are specified by
a) the titer of the employed fibers, which indicates the weight of the individual fiber and which represents a measure for the thickness of the fiber and thus for the spring force. In actual practice, combinations of different titers are employed in order to obtain both soft finish (micro-fiber) as well as re-set force (bristle-type).
b) Geometry of the fibers (curling, cross-sectional distribution)
c) orientation of the fibers
d) percentage of bi-component fibers (BIKO) which produce, in thermally fused fabrics, the fusing within the fabric by melting of the one component. A BIKO percentage between 0 and 40% is typical, a percentage of 20% is preferred.
e) the titer of the BIKO fibers, which typically lies between 1 and 20 dtex, preferably 6.6 dtex, but which, in extreme cases, may also amount to up to 120 dtex or <1 dtex.

The weight of the fabric layers lies appropriately between 200 and 600 g/m², preferably approximately 300 g/m².

Foam layers which can be utilized as elastic layer 3 consist, appropriately, of polyurethane, polyethylene, EVA or thermo-/duroplastic materials.

Finally, a component of the resilient layer 3 may also be gas or air. Pre-requisite for said solution is that the cover layers 4 and 5 form a sealed-off pocket, which envelops the layer of air. The hollow space formed by the cover layers 4 and 5 contains, for example, a fabric or foam layer plus air. The possibility also exists that with suitable geometry the inventive structural component 1 comprises only the two cover layers 4, 5 and a gaseous elastic layer 3. It is essential that the air cushion, delineated by the cover layer, possesses the necessary resilient force.

The properties (in particular stability and effectiveness) of the inventive structural element or molded component 1 depend upon their weight. Therefore, weight must be chosen according to application. Suitable weights range between 400 and 2000 g/m².

A molded component according to the invention can be produced, for example, of sheets in one working step. By making use of the relatively thick elastic layer, it is possible to vary the thickness of the structural element 1 and its local mechanical and acoustic properties by means of tooling shape and extent of extrusion. For example, the edges of the component 1 can be extruded in such manner that no hollow spaces develop, in other words, so that the inner elastic layer 3 is totally sealed off.

The stability of the component is significantly increased by use of several layers, since the sandwich compound functions like a double-T-support. Further increase in stability can be attained by foil distance and structuring of the component. Optimization of stability and acoustic effectiveness is only possible with the inventive molded element 1. A comparable mass-produced structural element, which is in accordance with the state of the art (trilaminate) is heavier and less effective and clearly presents lower stability through the supporting plastic layer in the center of the construction. The thickness of the multi-layer molded component according to the invention varies between approximately 1 mm (extruded) and 10 mm and ranges typically between 3 and 6 mm.

FIGS. 6A and 6B reveal another variation of the component 1 according to the invention as well as a method for the manufacture of said components.

FIG. 6A depicts, schematically, a semifinished article 13, which comprises a middle layer 14 and two cover layers 15, 16 laminated thereon. The middle layer 14 corresponds, insofar as its properties are concerned, to the cover layers 4, 5 of an inventive molded element. Layers 15 and 16 correspond to layers 6, 9 of an inventive molded element.

When manufacturing molded elements 1 from semifinished articles 13 of this type, the simplified handling is of benefit compared with the purely individual materials. For example, a cover layer laminated on both sides with fibrous material can be better heated by means of contact without pasting up the heating plates, and without sagging when being softened.

Multi-layer molded elements 1 can be produced by folding the semifinished item 13. The arrows 17 in FIG. 6A indicate a folding method which is completed when implemented according to FIG. 6B. In the specific embodiment represented in FIG. 6B, the layer system of the semifinished item 13 are placed, at a distance, above each other and form a hollow space 18 (3). In said hollow space can be located an air layer (as represented), a fibrous material-/foam layer or a combination of air- and fibrous material-/foam layer. These layers form a resilient layer 3 of the structural component 1. The layer 14 (4) or 14 (5) forms the cover layers. The two layer systems, however, need not necessarily form a hollow space after folding. They can be placed on top of each other. The two adjoining and accordingly designed cover layers 15 form the resilient layer 3 in this specific embodiment.

In FIG. 6B it is schematically indicated that the structural component 1 is compressed in its marginal area in such manner that the air located in hollow space 18 cannot escape. Designing the structural element 1 as an air cushion is thus possible. For manufacturing a structural element of this kind, cover layers 15, 16 (9) are not absolutely necessary. In this case, the inventive component consists only of an air cushion which is delimited by the cover layers 4, 5. When producing such an air pocket, it is appropriate to employ the blow-molding method.

Shaping of inventive molded components 1 is done under employment of pressure and/or heat. During the pressing-/cool-down step, the elastic/absorbing volume can be enlarged by inflation with air, as a result of which there is improvement in the acoustic effect and fold formation is prevented in the foil facing the wheel. In the blow-forming method, a pressurized air nozzle is inserted into the resilient layer 3 through a recess in the sealing edge of the press tool or a hole in the cover layer. FIG. 6B depicts a nozzle of this type, which is identified with 19. The resulting aperture can subsequently be pressed together or optionally also be used as run-off. By appropriate design of the hole (flow, cross-section) optimization of the elastic properties of the component are also possible (air pump effect).

Fold formation and bulge development in the structural component can also be prevented by pre-stressing of the material. As a result, the pressing turns, in part, into a deep-drawing. In the extreme case, a vacuum deep-drawing is also possible.

Figure 7:
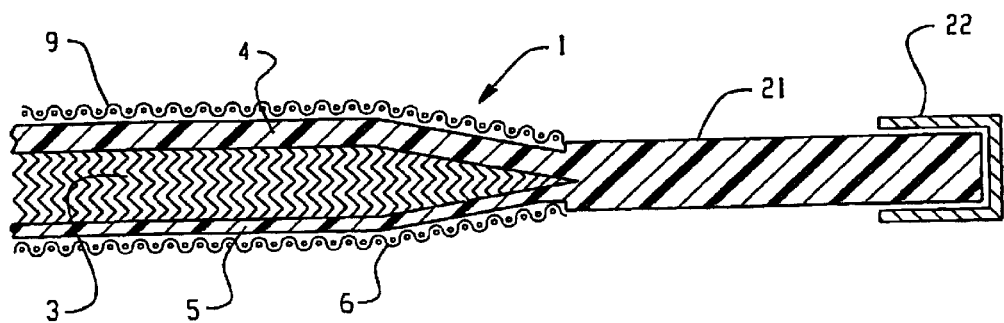
FIG. 7 illustrates one embodiment of an edge construction for the multi-layer molded element of any one of FIGS. 1–4 and 6B.
Figure 8:
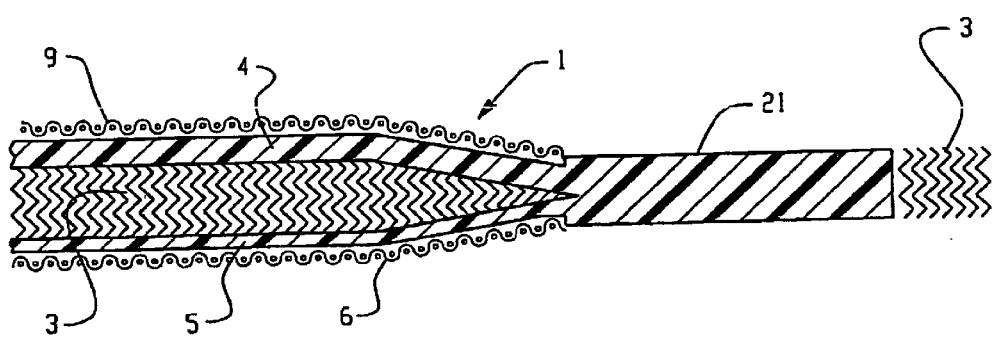
FIG. 8 illustrates an alternate edge construction embodiment.
Figure 9:
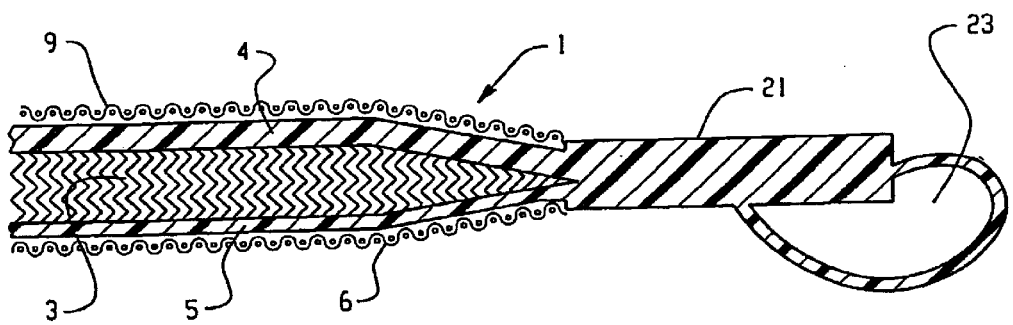
FIG. 9 illustrates yet another edge construction embodiment.

Formation of marginal regions of the inventive structural components 1 are apparent from FIGS. 7, 8, 9. Their edges are all hard-pressed. It must be prevented that these hard-pressed areas (needed for sealing and required as edge delimitation for reasons of stability) will rub against the body of the vehicle and do damage to the applied protective coating, thus causing corrosion to the vehicle. Contact between hard-pressed edges 21 and the body of the vehicle can be prevented in different ways:

a) padding of edges by application of an isolating layer, for example foam or caoutchouc- and/or resin mass.

b) Application of a separate protective- and/or cover strip 22, for example of rubber (piping band) FIG. 7.

c) skilful trimming of the structural component, so that layers 4, 5, 6, 9 are removed outside of the hard-pressed marginal region and the farther brought-out fibrous material 3 itself forms a cushion (FIG. 8).

d) Air balloon-like cushion 23, by employing the blow-molding method or by deep-drawing.

In order to render structural components of the inventive type suitable for multiple use, it is appropriate to equip the marginal regions with T-structures of the kind represented in FIG. 5. Functions of the T-piece are, for example, integration of spoilers for aero-dynamics or of mud flaps. Moreover, it is possible with a T-piece to simplify attachment of the structural component to the sub-floor. Until now, it was only possible to realize such hinged segments with injection molding components. Textile molded pieces according to the state of the art had to be supplemented with separate (purchased) add-on parts.

Figure 12:
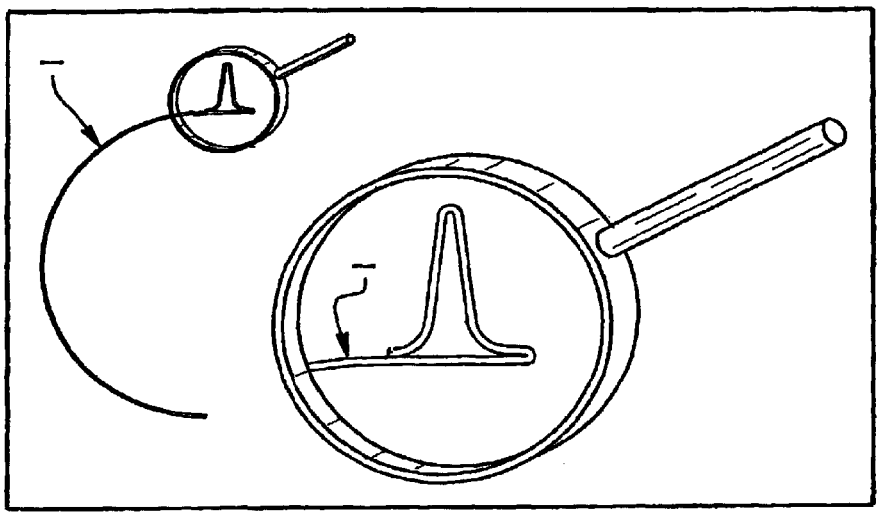
FIG. 12 illustrates yet another alternate embodiment of the T-construction.
Figure 11:
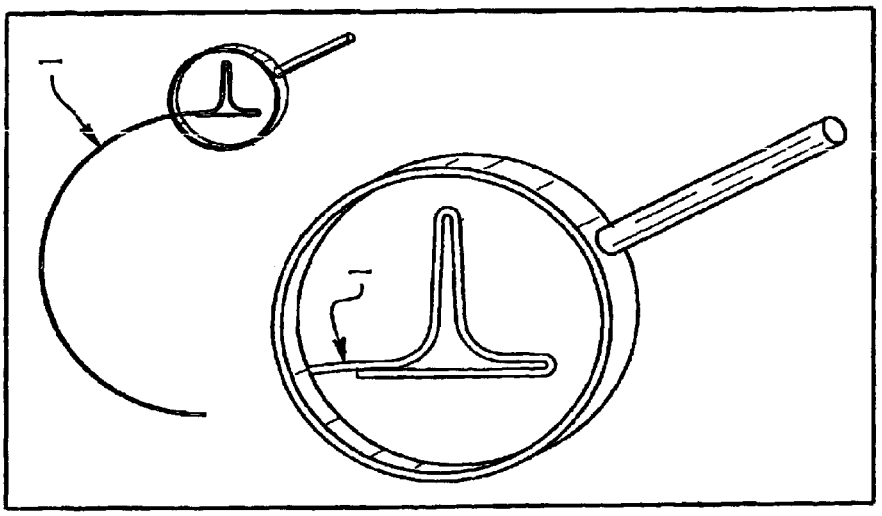
FIG. 11 illustrates an alternate embodiment of the T-construction.
Figure 10:
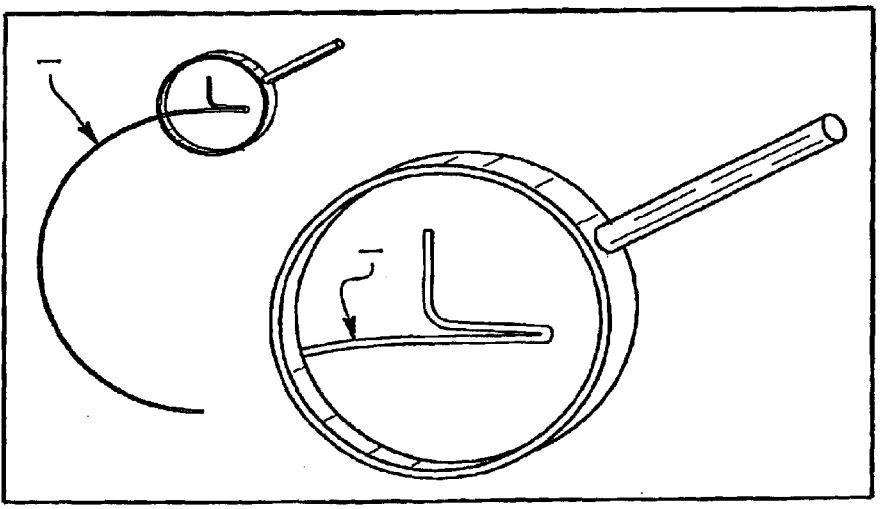
FIG. 10 illustrates one embodiment of the T-construction of FIG. 5.

FIGS. 10 to 12 indicate that T-fittings can also be realized in various modes with multi-layer molded components according to the invention:

a) by folding and hard-pressing of the material (FIG. 10).

b) by opening up the material and inserting additional foils/fibrous materials in "dovetail geometry" (FIG. 11).

c) by "pulling out" the upper foil, as a result of which it is possible to integrate, for example, cable holders and similar functions. (FIG. 12).

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A multi-layer molded element for bottom covering of an exterior of motor vehicle floor areas or wheel housings, the molded element comprising:
   a wheel-side cover layer of a material with thermoplastic properties and having a weight per unit area of 150 to 1500 g/m² and a thickness of 100 to 500 µm;
   a vehicle underside cover layer of a material having thermoplastic properties and having a weight per unit area of 150 to 1500 g/m² and a thickness of 200 to 1000 µm;
   at least one of the cover layers being laminated with a non-woven fabric layer with a weight per unit area of 50 to 200 g/m²;
   a non-woven resilient layer enclosed between the cover layers, said resilient layer forming an elastic mass system together with the wheel-side cover layer;
   the molded element having an overall weight per unit area of 400 to 2000 g/m² and overall thickness of 1 to 10 mm.

2. The molded element according to claim 1, wherein the resilient layer includes a non-woven fabric with a weight per unit area between 200 and 400 g/m².

3. The molded element according to claim 1, wherein the resilient layer includes foam.

4. The molded element according to claim 1, wherein the resilient layer includes a layer of air.

5. The molded element according to claim 1, wherein the resilient layer includes at least one of:
   fibrous material,
   foam,
   air.

6. The molded element according to claim 1, wherein the wheel-side cover layer includes a resin-treated fibrous material.

7. The molded element according to claim 1, further including:
   a function expanding element.

8. The molded element according to claim 1, wherein the molded element has a thickness between 3 and 6 mm.

9. The molded element according to claim 1, wherein both cover layers are laminated on both sides.

10. A multi-layer molded element for bottom covering of an exterior of motor vehicle floor areas or wheel housings, the molded element comprising:
    a road-side cover layer of a material with thermoplastic properties and having a weight per unit area of 150 to 1500 g/m² and a thickness of 100 to 500 µm;
    a vehicle underside cover layer of a material having thermoplastic properties and having a weight per unit area of 150 to 1500 g/m² and a thickness of 200 to 1000 µm;
    a non-woven resilient layer enclosed between the cover layers, said resilient layer forming an elastic mass system together with the road-side cover layer;
    edge sections of the cover layers being directly pressed and bonded together;
    the molded element having an overall weight per unit area of 400 to 2000 g/m² and overall thickness of 1 to 10 mm.

11. The molded element according to claim 10 wherein the road-side covering layer has a thickness of 150 to 250 µm.

12. The molded element according to claim 10 wherein the vehicle underside cover layer has a thickness of 300–600 µm.

13. The molded element according to claim 10, further including:
    an aperture into an interior region between the cover layers.

14. The molded element according to claim 13, wherein the resilient layer includes at least in part, a pocket of trapped gas and the aperture serves for adjustment of elastic properties.

15. The molded element according to claim 10 wherein the road-side cover layer is water impermeable and flexible, such that objects impacting the road-side cover layer flex the road-side cover layer compressing a portion of the resilient layer to distribute the impact and damp noise.

16. The molded element according to claim 15 further including:
    a fabric layer bonded to one of the cover layers to absorb high frequency noise.

17. A multi-layer molded element for covering of an exterior of motor vehicle floor areas or wheel housings, the molded element comprising:
    a wheel-side cover layer of a material with thermoplastic properties and having a weight per unit area of 150 to 1500 g/m² and a thickness of 100 to 500 µm;
    a vehicle underside cover layer of a material having thermoplastic properties and having a weight per unit area of 150 to 1500 g/m² and a thickness of 200 to 1000 µm;
    a non-woven resilient layer enclosed between the cover layers, said resilient layer forming an elastic mass system together with the wheel-side cover layer;
    edge sections of the molded element being padded;
    the molded element having an overall weight per unit area of 400 to 2000 g/m² and overall thickness of 1 to 10 mm.

18. A multi-layer molded element for bottom covering of an exterior of motor vehicle floor areas or wheel housings, the molded element comprising:
    a wheel-side cover layer of a material with thermoplastic properties and having a weight per unit area of 150 to 1500 g/m² and a thickness of 100 to 500 µm;
    a vehicle underside cover layer of a material having thermoplastic properties and having a weight per unit area of 150 to 1500 g/m² and a thickness of 200 to 1000 µm;
    a non-woven resilient layer enclosed between the cover layers, said resilient layer forming an elastic mass system together with the wheel-side cover layer;
    the molded element having an overall weight per unit area of 400 to 2000 g/m² and overall thickness of 1 to 10 mm and having T-shaped structures for attachment.

19. A multi-layer molded element for covering of an exterior of motor vehicle floor areas or wheel housings, the molded element comprising:
    a wheel or road facing cover layer of a material with thermoplastic properties and having a weight per unit area of 150 to 1500 g/m² and a thickness of 100 to 500 µm;
    a vehicle facing cover layer of a material having thermoplastic properties and having a weight per unit area of 150 to 1500 g/m² and a thickness of 200 to 1000 µm;
    a non-woven resilient layer enclosed between the cover layers, said resilient layer forming an elastic mass system together with the wheel or road facing cover layer;
    edge areas of the molded element being compressed;
    the molded element having an overall weight per unit area of 400 to 2000 g/m² and overall thickness of 1 to 10 mm.

* * * * *